Oct. 2, 1956  J. STRINDLUND  2,765,086
ROTARY SUCTION DRUM FILTER
Filed Feb. 24, 1954  2 Sheets-Sheet 1

INVENTOR.
JOHN STRINDLUND
BY
Marechal Biebel French & Bugg
ATTORNEYS

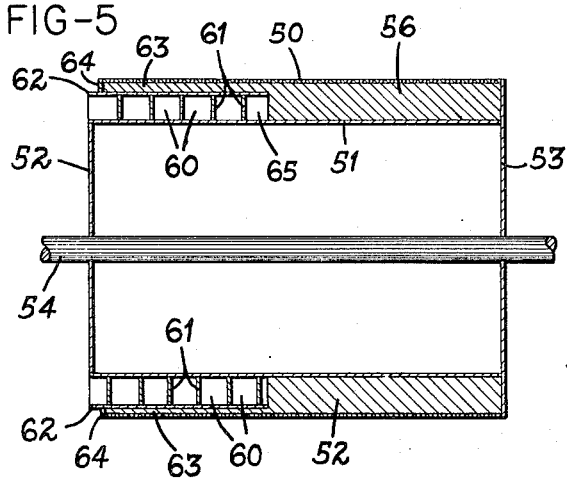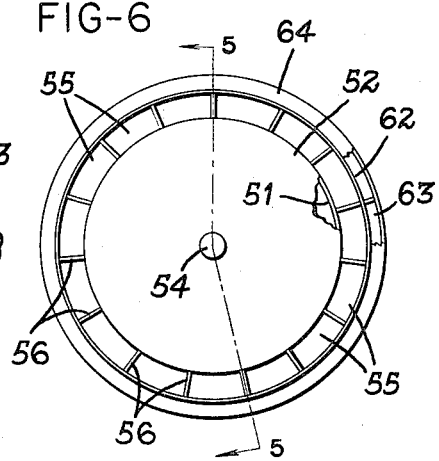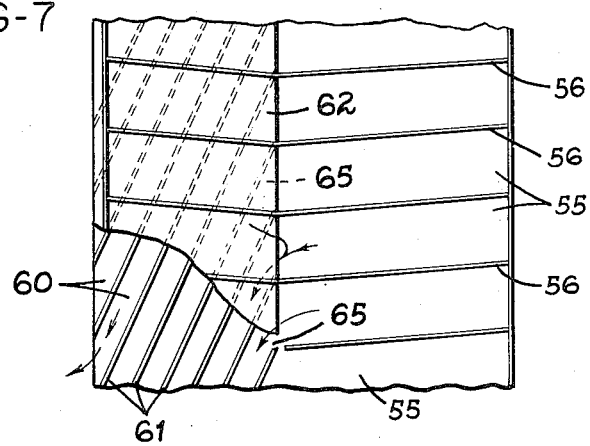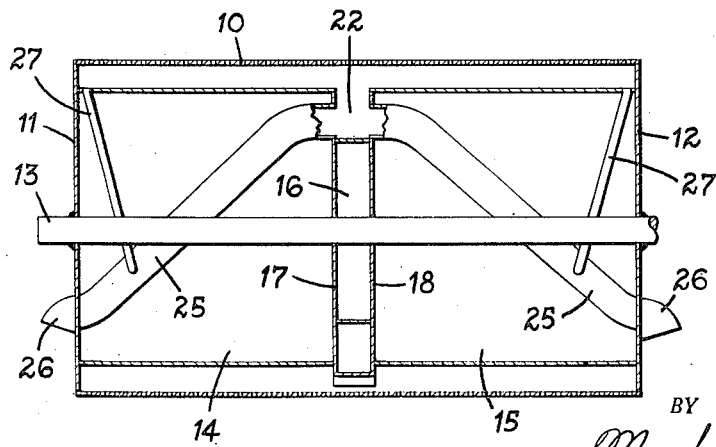

United States Patent Office 2,765,086
Patented Oct. 2, 1956

2,765,086

ROTARY SUCTION DRUM FILTER

John Strindlund, Upsala, Sweden, assignor to The Black-Clawson Company, Hamilton, Ohio, a corporation of Ohio Application February 24, 1954, Serial No. 412,334

12 Claims. (Cl. 210—202)

This invention relates to rotary suction drum filters of the type including a cylindrical strainer disposed in spaced relation to the outer surface of an inner shell or casing, a circumferential row of longitudinally extending cells located between the casing and strainer and each having an outlet spaced between the ends of the drum, and rearwardly bent discharge ducts leading from the outlets of the cells to discharge the liquid entering the cells through the strainer.

A primary object of the invention is to provide a rotary suction drum filter of the above outlined type in which the discharge ducts extend axially of the drum to one or both ends of the drum and in which also the discharge ducts are generally helically arranged within the drum to locate the discharge ends thereof in desired angular spacing rearwardly of their associated cells in the direction of rotation of the drum.

It is also an object of the invention to provide such a rotary suction drum filter in which the discharge ducts may comprise separate tubes or pipes within the drum casing and alternatively in which the discharge ducts are formed partly by the drum casing in cooperation with helically arranged partition walls carried by the casing.

Additional objects and advantages of the invention will be apparent from the following description, the accompanying drawings and the appended claims.

In the drawings—

Fig. 5 is a sectional view on the line 5—5 of Fig. 6 showing still another construction of rotary suction drum filter in accordance with the invention;

Fig. 6 is an end elevational view of the filter of Fig. 5 looking from left to right in Fig. 5;

Fig. 7 is a developed side elevational view of the filter of Figs. 5 and 6 with the strainer removed; and Fig. 8 is a view similar to Fig. 1 showing a further construction of rotary suction drum filter in accordance with the invention.

Figure 1:
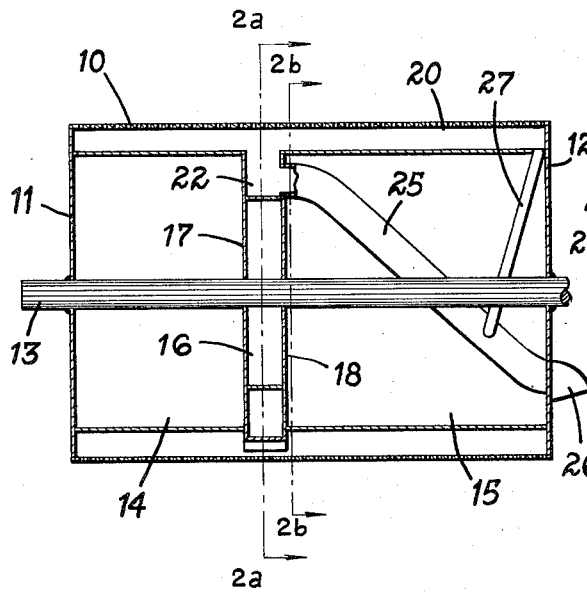
Fig. 1 is a sectional view showing a rotary suction drum filter constructed in accordance with the invention, the view being in section approximately on the line 1—1 of Fig. 2.
Figure 2:
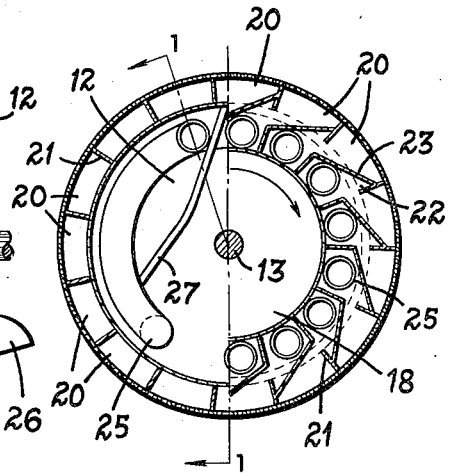
Fig. 2 is a radial section through the filter of Fig. 1 with the right half being taken on the line 2a—2a of Fig. 1 and the left half being taken on the line 2b—2b of Fig. 1, and only one discharge duct is shown for clarity of illustration.

Referring to the drawings, which illustrate preferred embodiments of the invention, in Figs. 1 and 2, the cylindrical perforate strainer 10 is supported by a pair of end plates 11 and 12 mounted for rotation on the shaft 13. Within the strainer is an inner shell or casing shown as formed of two drum sections 14 and 15 of the same diameter connected in axially spaced relation by a middle drum section 16 of lesser diameter, the sections 14 and 15 having inner end walls 17 and 18 respectively. The annular space between the strainer 10 and the inner casing is separated into a plurality of cells 20 by generally radially and axially extending walls 21, and each cell 20 has an outlet 22 formed by walls 23 in the space bounded by the drum section 16 and end walls 17 and 18.

Each of the outlets 22 is provided with a discharge duct 25 formed of pipe or flexible tubing opening through the wall 18 and extending axially of the drum through the adjacent end plate 12. Each duct 25 is arranged in a generally helical spiral from the outlet 22 in the direction opposite the direction of rotation of the drum indicated by the arrow in Fig. 2 to locate the discharge end of each duct at the desired angular spacing rearwardly of its associated outlet. In addition, as shown in Fig. 2, the helical curvature of each duct 25 is centered on the axis of shaft 13 so that the ducts as a whole define a substantially cylindrical coil concentric with the drum sections 14 and 15, and the radial spacing of each duct from the shaft 13 is therefore substantially uniform throughout its entire length. The discharge end of each duct 25 is accordingly located at substantially the same radial spacing from shaft 13 as the outlet 22 from its associated cell 20, and it is also shown as provided with a cap 26 for increasing the effective height of suction therethrough. In order to assure complete filling of the ducts with liquid during their upward movement, they are shown as provided with venting tubes 27 connecting through the drum section 15 with their associated cells 20 in accordance with my application Serial No. 337,826, filed February 19, 1953, and issued January 24, 1956, as Patent No. 2,732,081 to the same assignee as this application. In operation, these tubes 27 form flow passages connecting the discharge end of each duct with its associated cell for transmission of air therebetween to prevent a possible air lock during collection of liquid in the cell and the forward portion of the duct.

Since with this construction the interiors of the casing sections 14 and 15 never come in contact with the liquid being filtered, it is unnecessary to make provision for resistance to corrosion of these parts except on their outer surfaces. The drum is accordingly economical to produce by utilizing comparatively inexpensive metal for the casings which may be provided on their outer surfaces with acid resisting or otherwise non-corrosive coatings or layers. Similarly, while the ducts 25 may be of pipe, they could also be made of rubber or other flexible tubing, and they are not necessarily of circular section as shown but may be of other configuration if desired. It should also be noted that while preferred results are obtained with the ducts formed to a helical curvature, other curvatures may be used particularly if minor quantities of liquid are to be handled.

In operation, this construction provides several important advantages, including both rapid and uniform discharge of liquid from the cells 20 and also a relatively large height of suction established by the angular spacing of the discharge ends of the ducts from their associated cell outlets. The construction of Figs. 1 and 2 makes it possible to provide outlets of greater cross section than their associated ducts, and inflow of air and outflow of liquid is facilitated. Another practical advantage is that the liquid discharge from the ducts is readily visible at the end of the drum.

Figure 3:
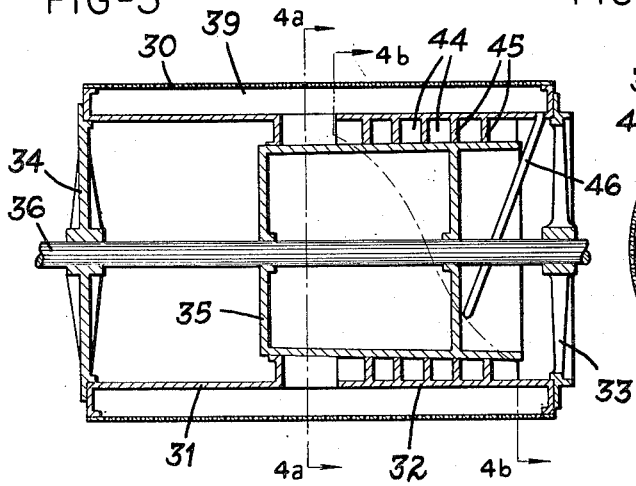
Fig. 3 is a section on the line 3—3 of Fig. 4 showing another construction of rotary suction drum filter in accordance with the invention.
Figure 4:
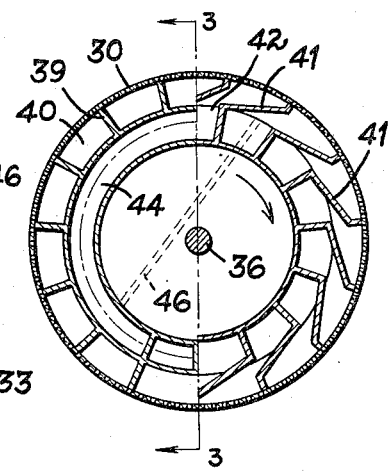
Fig. 4 is a radial section through the filter of Fig. 3 with the right half taken on the line 4a—4a of Fig. 3 and the left half being a partially developed section as indicated by the line 4b—4b of Fig. 3.

In Figs. 3 and 4, the strainer 30 is supported by two drum casings 31 and 32 which are in turn supported by an end spider 33 at one end of the drum, an end plate 34 at the other end of the drum, and an inner drum section 35 all mounted on a shaft 36. The space between the strainer 30 and casings 31 and 32 is separated by walls 39 into cells 40, and additional walls 41 form outlets 42 from the cells in the space between the casings 31 and 32. The discharge ducts 44 from the outlets 42 are in turn formed by partitions 45 of generally helical configuration between the casing 32 and inner drum 35.

The ducts 44 open axially into their associated outlets 42 as shown, and they run out into the open space between the outer end portions of the casing 32 and drum 35 in the desired angular spacing rearwardly of their associated outlets in the direction of rotation of the drum. Each duct 44 is also shown as provided with a venting pipe 46 corresponding to the part 27 in Figs. 1 and 2 as described. Suitable tight conditions are readily established within the drum by forming the drum section 35 with a slight taper as shown and by casting the partitions 45 integrally with the casing 32 and with appropriately tapered inner diameters for close fitting with the drum section 35, thereby facilitating the provision of rubber or other lining for the ducts. If desired, the reverse arrangement may be employed by forming the casing 32 with a slight taper and by casting the partitions 45 integrally with the drum sections 35. The operation of this form of the filter is essentially the same as that of the form of Figs. 1 and 2.

Figs. 5-7 show a further form of filter in accordance with the invention in which the strainer 50 is supported by a drum casing 51 having end plates 52 and 53 mounted on shaft 54. The space between the strainer 50 and casing 51 is divided into cells 55 by walls 56 which extend forwardly in the direction of rotation of the drum to establish a relatively flat V-shape for the cells 55, reference being made in this connection to my application Serial No. 297,746, filed July 8, 1952, and issued January 24, 1956 as Patent No. 2,732,080 to the same assignee as this application. The discharge ducts 60 from the cells 55 are formed by helically arranged partitions 61 mounted between the outer surface of the casing 51 and a cylindrical cover 62 of lesser diameter than the strainer 50 to leave space 63 therebetween which is closed at its outer end by a ring 64 between the strainer 50 and cover 62.

As shown in Fig. 7, each partition 61 leads from the point formed by one of the V-shaped walls 56 to the end of the drum, and since these walls lie only in the spaces radially outwardly of the cover 62 and axially to the right of this cover in Fig. 5, this leaves an outlet opening 65 for each cell into its associated duct. The liquid thus flows from both ends of the drum to this outlet opening as indicated by the arrows in Fig. 7. This construction of drum may be readily made as a cast or welded structure with or without rubberizing, and if it is cast and the drum casing 51 is rubberized, the cover 62 is preferably formed as a detachable annular member in one or more pieces. Another advantage of this construction is that in operation, the ducts 60 act as pumping wheels to increase the suction effect.

In all of the embodiments of the invention as described above, the several discharge ducts are shown as all extending to the same one end of the filter, but it is equally possible to arrange the ducts in such manner that two extend to opposite ends of the filter from each cell. Thus Fig. 8 shows a filter construction generally as described in connection with Fig. 1 but including two ducts 25 leading from each outlet 22 to the opposite ends of the drum, and these ducts are arranged in opposite spirals to position the discharge ends of both ducts at the desired angular spacing rearwardly of their associated cell and outlet. It will be apparent that similar construction may be readily incorporated in other forms of the invention as described.

While the form of apparatus herein described constitutes a preferred embodiment of the invention, it is to be understood that the invention is not limited to this precise form of apparaus, and that changes may be made therein without departing from the scope of the invention which is defined in the appended claims.

What is claimed is:

1. A rotary suction drum filter comprising a drum casing, a cylindrical strainer disposed in concentric outwardly spaced relation to the outer surface of said casing, generally radially arranged walls disposed between said casing and said strainer to define a plurality of cells in the space between said strainer and said casing, means forming a separate discharge outlet from each of said cells and spaced between the ends of said cells, discharge ducts extending generally axially of said casing from said outlets to a discharge position at one end of said casing, and said ducts being generally helically arranged in the form of a substantially cylindrical coil concentric with and adjacent the inner surface of said casing to locate the discharge end of each of said ducts at a substantial angular distance rearwardly of the associated said outlet in the direction of rotation of said filter and at substantially the same radial spacing from the axis of said casing as said associated outlet for correspondingly increased height of suction in each said duct as the associated said cells rise successively during rotation of said filter.

2. A rotary suction drum filter comprising a drum casing, a cylindrical strainer disposed in concentric outwardly spaced relation to the outer surface of said casing, generally radially arranged walls disposed between said casing and said strainer to define a plurality of cells in the space between said strainer and said casing, means forming a separate discharge outlet from each of said cells and spaced between the ends of said cells, discharge ducts opening through said casing to said outlets and extending within said casing from said outlets to a discharge position at one end of said casing, and said ducts being generally helically arranged in the form of a substantially cylindrical coil concentric with and adjacent the inner surface of said casing to locate the discharge end of each of said ducts at a substantial angular distance rearwardly of the associated said outlet in the direction of rotation of said filter and at substantially the same radial spacing from the axis of said casing as said associated outlet for correspondingly increased height of suction in each said duct as the associated said cells rise successively during rotation of said filter.

3. A rotary suction drum filter comprising a drum casing, a cylindrical strainer disposed in concentric outwardly spaced relation to the outer surface of said casing, generally radially arranged walls disposed between said casing and said strainer to define a plurality of cells in the space between said strainer and said casing, means forming a separate discharge outlet from each of said cells and spaced between the ends of said cells, an annular shell supported in substantially concentric and radially spaced relation with said casing to provide an annular space therebetween, generally radially arranged partitions secured between said casing and said shell and cooperating therewith to form discharge ducts extending generally axially of said casing from said outlets to a discharge position at one end of said casing, and said partitions being generally helically arranged to cause said ducts to define a substantially cylindrical coil concentric with and adjacent the inner surface of said casing to locate the discharge end of each of said ducts at a substantial angular distance rearwardly of the associated said outlet in the direction of rotation of said filter and at substantially the same radial spacing from the axis of said casing as said associated outlet for correspondingly increased height of suction in each said duct as the associated said cells rise successively during rotation of said filter.

4. A rotary suction drum filter comprising a drum casing, a cylindrical strainer disposed in concentric outwardly spaced relation to the outer surface of said casing, generally radially arranged walls disposed between said casing and said strainer to define a plurality of cells in the space between said strainer and said casing, a drum shell located in telescoping concentric relation within said casing and of smaller diameter than said casing to leave an annular space therebetween, means forming a separate discharge outlet from each of said cells spaced from both ends of said casing and opening into said annular space, generally radially arranged partitions located in said annular space and cooperating with said casing and said shell to form discharge ducts extending through said space from said outlets to a discharge position at one end of said casing, and said partitions being generally helically arranged to cause said ducts to define a substantially cylindrical coil concentric with and adjacent the inner surface of said casing to locate the discharge end of each of said ducts at a substantial angular distance rearwardly of the associated said outlet in the direction of rotation of said filter and at substantially the same radial spacing from the axis of said casing as said associated outlet for correspondingly increased height of suction in each said duct as the associated said cells rise successively during rotation of said filter.

5. A rotary suction drum filter comprising a cylinder strainer, an outer drum casing disposed in concentric inwardly spaced relation to the inner surface of said strainer, generally radially arranged walls disposed between said casing and said strainer to define a plurality of cells in the space between said strainer and said casing, an inner drum casing located in telescoping concentric relation within said outer casing and of smaller diameter to leave an annular space therebetween, one of said casings being of tapered axial section, means forming a separate discharge outlet from each of said cells into said annular space, generally radially arranged partitions located in said annular space and cooperating with said casings to form discharge ducts extending through said space from said outlets to a discharge position at one end of said outer casing, said partitions being formed integrally with said outer casing and having the opposite edges thereof engaging said tapered casing and correspondingly tapered to seal thereagainst upon assembly of said casings in telescoping relation, and said partitions being generally helically arranged in said annular space to cause said ducts to define a substantially cylindrical coil concentric with and adjacent the inner surface of said outer casing to locate the discharge end of each of said ducts at a substantial angular distance rearwardly of the associated said outlet in the direction of rotation of said filter and at substantially the same radial spacing from the axis of said casing as said associated outlet for correspondingly increased height of suction in each said duct as the associated said cells rise successively during rotation of said filter.

6. A rotary suction drum filter comprising a drum casing, a cylindrical strainer disposed in concentric outwardly spaced relation to the outer surface of said casing, generally radially arranged walls disposed between said casing and said strainer to define a plurality of cells in the space between said strainer and said casing, means forming a separate discharge outlet from each of said cells located in a radial plane spaced from both ends of said casing, generally radially arranged partitions secured to the inner surface of said casing and defining discharge ducts leading from said outlets to a discharge position at one end of said casing, an annular shell supported in substantially concentric and inwardly spaced relation with said casing to form the inner wall of said ducts, and said partitions being generally helically arranged to cause said ducts to define a substantially cylindrical coil concentric with and adjacent the inner surface of said casing to locate the discharge end of each of said ducts at a substantial angular distance rearwardly of the associated said outlet in the direction of rotation of said filter and at substantially the same radial spacing from the axis of said casing as said associated outlet for correspondingly increased height of suction in each said duct as the associated said cells rise successively during rotation of said filter.

7. A rotary suction drum filter comprising a drum casing, a cylindrical strainer disposed in concentric outwardly spaced relation to the outer surface of said casing, generally radially arranged walls disposed between said casing and said strainer to define a plurality of cells in the space between said strainer and said casing, means forming a separate discharge outlet from each of said cells located in a radial plane spaced from both ends of said casing, generally radially arranged partitions secured to the outer surface of said casing and defining discharge ducts leading from said outlets to a discharge position at one end of said casing, an annular shell supported in substantially concentric and outwardly spaced relation with said casing to form the outer wall of said ducts, and said partitions being generally helically arranged to cause said ducts to define a substantially cylindrical coil concentric with and adjacent the inner surface of said casing to locate the discharge end of each of said ducts at a substantial angular distance rearwardly of the associated said outlet in the direction of rotation of said filter and at substantially the same radial spacing from the axis of said casing as said associated outlet for correspondingly increased height of suction in each said duct as the associated said cells rise successively during rotation of said filter.

8. A rotary suction drum filter comprising a drum casing, a cylindrical strainer disposed in concentric outwardly spaced relation to the outer surface of said casing, generally radially arranged walls disposed between said casing and said strainer to define a plurality of cells in the space between said strainer and said casing, means forming a separate discharge outlet from each of said cells located in a common radial plane spaced from both ends of said casing, said walls being inclined forwardly in the directtion of rotation of said casing from the associated said outlets to conduct to said outlets the liquid entering said cells through said strainer, generally radially arranged partitions secured to the outer surface of said casing and defining discharge ducts leading from said outlets to a discharge position at one end of said casing, an annular shell supported in substantially concentric and outwardly spaced relation with said casing to form the outer wall of said ducts, said partitions being generally helically arranged and extending from a radial plane adjacent the opposite sides of said outlets from the discharge ends of said ducts to cause said ducts to define a substantially cylindrical coil concentric with said casing and to locate said discharge end of each of said ducts at a substantial angular distance rearwardly of the associated said outlet in the direction of rotation of said filter and at substantially the same radial spacing from the axis of said casing as said associated outlet for correspondingly increased height of suction in each said duct as the associated said cells rise successively during rotation of said filter, and said annular shell being of sufficiently lesser diameter than said strainer to leave connecting portions of said cells of lesser radial dimensions than the remainder of said cells.

9. A rotary suction drum filter comprising a drum casing, a cylindrical strainer disposed in concentric outwardly spaced relation to the outer surface of said casing, generally radially arranged walls disposed between said casing and said strainer to define a plurality of cells in the space between said strainer and said casing, means forming a separate discharge outlet from each of said cells and spaced between the ends of said cells, discharge ducts extending generally axially of said rasing from said outlets to a discharge position at one end of said casing, said ducts being generally helically arranged in the form of a substantially cylindrical coil concentric with and adjacent the inner surface of said casing to locate the discharge end of each of said ducts at a substantial angular distance rearwardly of the associated said outlet in the direction of rotation of said filter and at substantially the same radial spacing from the axis of said casing as said associated outlet for correspondingly increased height of suction in each said duct as the asociated said cells rise successively during rotation of said filter, and means forming a flow passage connecting the discharge end of each of said ducts with the associated said cell for transmission of air between said cell and the discharge end of said duct during collection of liquid in said cell and the forward portion of said duct.

10. A rotary suction drum filter comprising a drum casing, a cylindrical strainer disposed in concentric outwardly spaced relation to the outer surface of said casing, generally radially arranged walls disposed between said casing and said strainer to define a plurality of cells in the space between said strainer and said casing, means forming a separate discharge outlet from each of said cells and spaced between the ends of said cells, a pair of discharge ducts extending axially of said casing from each of said outlets to discharge positions at opposite ends of said casing, and said ducts being generally helically arranged in opposite directions in the form of substantially cylindrical coils concentric with and adjacent the inner surface of said casing to locate the discharge ends thereof at a substantial angular distance rearwardly of the associated said outlet in the direction of rotation of said filter and at substantially the same radial spacing from the axis of said casing as said associated outlet for correspondingly increased height of suction in each said duct as the associated said cells rise successively during rotation of said filter.

11. A rotary suction drum filter comprising a drum casing, means sealing the interior of said casing against contact with liquid in which said casing is immersed, a cylindrical strainer disposed in concentric outwardly spaced relation to the outer surface of said casing to define therewith an annular space, generally radially extending walls disposed between said casing and said strainer to define in said space a plurality of generally axially extending cells, means forming a separate discharge outlet from each of said cells at a location spaced between the ends thereof, a discharge duct connected with each said outlet, said ducts extending generally axially of said casing from the associated said outlet to a discharge position at one end of said casing to conduct liquid from the associated said cell to the outer end of said casing while shielding the interior of said casing from contact with said liquid, and said ducts being generally helically arranged in the form of a substantially cylindrical coil concentric with and adjacent the inner surface of said casing to locate the discharge end of each of said ducts at a substantial angular distance rearwardly of the associated said cell outlet in the direction of rotation of said filter and at substantially the same radial spacing from the axis of said casing as said associated outlet for correspondingly increased height of suction in each said duct as the associated said cells rise successively during rotation of said filter.

12. A rotary suction drum filter comprising a drum casing, means sealing the interior of said casing against contact with liquid in which said casing is immersed, a cylindrical strainer disposed in concentric outwardly spaced relation to the outer surface of said casing to define therewith an annular space, generally radially extending walls disposed between said casing and said strainer to define in said space a plurality of generally axially extending cells, means forming a separate discharge outlet from each of said cells at a location spaced between the ends thereof, discharge pipes each connecting at one end with one of said cell outlets, said pipes extending generally axially of said casing through the interior of said casing to a discharge position outside one end of said casing to conduct liquid from the associated said cell to the outside of said casing while shielding the interior of said casing from contact with said liquid, and said pipes being generally helically arranged in the form of substantially cylindrical coils concentric with and adjacent the inner surface of said casing said casing to locate the discharge end of each of said pipes at a substantial angular distance rearwardly of the associated said outlet in the direction of rotation of said filter and at substantially the same radial spacing from the axis of said casing as said associated outlet for correspondingly increased height of suction in each said duct as the associated cells rise successively during rotation of said filter.

References Cited in the file of this patent

UNITED STATES PATENTS

| | | |
|---|---|---|
| 2,111,843 | Daman | Mar. 22, 1938 |
| 2,537,414 | Lindblad | Jan. 9, 1951 |
| 2,548,999 | Oliver | Apr. 17, 1951 |

FOREIGN PATENTS

| | | |
|---|---|---|
| 588,818 | Germany | Nov. 27, 1933 |
| 865,106 | Germany | Jan. 29, 1953 |